US006724416B1

(12) United States Patent
Liu (10) Patent No.: US 6,724,416 B1
(45) Date of Patent: Apr. 20, 2004

(54) IMAGE TRANSCEIVING TELEPHONE WITH INTEGRATED DIGITAL CAMERA

(76) Inventor: Jianxin Liu, 3305 Howard Common, Fremont, CA (US) 94536

( * ) Notice: Subject to any disclaimer, the term of this patent is extended or adjusted under 35 U.S.C. 154(b) by 0 days.

(21) Appl. No.: 10/263,099

(22) Filed: Oct. 1, 2002

(51) Int. Cl.[7] .............................................. H04N 7/14
(52) U.S. Cl. .............................. 348/14.02; 348/14.13; 348/14.01
(58) Field of Search ..................... 348/14.01–14.09, 348/14.1, 14.11–14.13, 14.14; 370/352; 709/204; H04N 7/14

(56) References Cited

U.S. PATENT DOCUMENTS

| | | | | |
|---|---|---|---|---|
| 5,910,815 | A | * 6/1999 | Boursier et al. | 348/14.01 |
| 6,380,967 | B1 | * 4/2002 | Sacca | 348/14.01 |
| 6,404,747 | B1 | * 6/2002 | Berry et al. | 370/270 |
| 6,502,077 | B1 | * 12/2002 | Speicher | 705/14 |
| 6,549,229 | B1 | * 4/2003 | Kirby et al. | 348/14.01 |
| 2003/0074404 | A1 | * 4/2003 | Paraker et al. | 709/204 |

FOREIGN PATENT DOCUMENTS

| | | | | |
|---|---|---|---|---|
| JP | 405111017 A | * 4/1993 | | H04N/7/14 |
| JP | 407111640 A | * 4/1995 | | H04N/7/14 |

OTHER PUBLICATIONS

Mazurek et al. ; Portable, Stand alone Video telephone system; Jul. 8, 1999; WO 99/34600;.*

* cited by examiner

Primary Examiner—Melur Ramakrishnaiah
(74) Attorney, Agent, or Firm—Chi Ping Chang; Pacific Law Group LLP (57) ABSTRACT

An Image Transceiving Telephone with Integrated Digital Camera (ITTDC) for simultaneous transceiving of real-time audio and non-real time image through a Public Switched Telephone Network (PSTN) is disclosed. The ITTDC includes an integrated telephone front end, a PSTN access device, an audio CODEC, an image input device, an image CODEC, an image display device, a local storage for an embedded system control software and associated control and operating parameters and data, an optional local electronic interface, a user-control and a system control including the embedded system control software. The control software further includes an audio sampling and processing means, an image capturing and processing means and a process priority control means allocating, via a real-time audio but non-real time image transfer protocol control, a highest priority to tasks for audio information processing whereas a lower priority to tasks for image information processing.

3 Claims, 7 Drawing Sheets

IMAGE TRANSCEIVING TELEPHONE WITH INTEGRATED DIGITAL CAMERA

FIELD OF THE INVENTION

This invention is related to the field of telephony. It introduces a new way of transferring audio and image data concurrently through a narrow bandwidth telephony system like PSTN. It discloses the idea of real-time transmission of speech concurrently with a non real-time transmission of quality images over a single physical telephone line.

BACKGROUND OF THE INVENTION

Nowadays audio and video communication systems are based on the Internet, an intranet, or ISDN, etc. as these audio and video communication systems may require a bandwidth higher than that can be provided by a traditional POTS. Two types of audio and video communication systems are briefly discussed below:

A videophone system requires both audio and video information be simultaneously transferred via a network in real time. Thus, inherently, the videophone system requires a high bandwidth network such as an ISDN for support. For those skilled in the art, the H.320 and H.323 standard describe the implementation of such a videophone system. An example of a commercial videophone system is Polycom's VS4000 videoconferencing system. While it provides for a simultaneous transfer of audio and video information between its users, the videophone system has the following disadvantages:

1. It is very expensive as both communication sites need to have a set of expensive video and audio equipments.
2. It needs to have a wide bandwidth connection, such as ISDN, for the transfer of video information.
3. It may still need an extra phone line to transfer an accompanying audio information.
4. If the system is implemented completely on a single wide bandwidth connection then it may not be compatible with the existing telephone system.

Another type of audio and video communication system are tele-conference systems. These systems are PC based and the connection is most likely through the Internet via a PC modem. Upon the establishment of a connection, the peer parts can exchange audio, video, data or any other kinds of information. An example of a commercial tele-conference system is Microsoft's NetMeeting. While it is not as expensive as the video phone system, the tele-conference system still has the following disadvantages:

1. It is still expensive as both communication sites still need a PC with an attached audio device and possibly also an attached video device.
2. Both sites still need to have some kind of Internet or intranet connection, via a Cable Modem, an ISDN or a dial-in modem, etc.
3. If the connection involves Internet, the audio quality could be bad depending upon the condition of the Internet traffic.
4. It is not compatible with the existing telephone system thus no normal phone conversation can take place.

In essence, both of these audio and video communication systems are incapable of concurrently transferring both audio and image information over a narrow bandwidth PSTN efficiently with a low-cost device while maintaining compatibility with the current standard telephone line. Therefore, the present invention of an Image Transceiving Telephone with Integrated Digital Camera (ITTDC) is disclosed to solve the aforementioned problems as well as to transfer high quality images over any long distance connection through the ubiquitous standard phone line.

SUMMARY

The ITTDC is invented to simultaneously transfer speech audio and image (including still and multi-frames) information over the same standard telephone line without the need of any expensive equipment. As a matter of course, both the audio and image information have to be digitized and compressed before transmission to make the most use of a single telephone line. However, during the transfer process, audio information is given a highest priority hence it is transferred in real time. On the other hand, image information is given a lower priority hence it is transferred on a non real-time basis generally not in synchrony with the audio information. Basically, the ITTDC is an enhanced telephone comprising three major modules: a digital camera, a telephone (MIC plus speaker) and a modem. The telephone module is made compatible with current standard telephone hence it can make and answer ordinary phone calls with any existing telephone unit of the world. In addition, the ITTDC is equipped with capability to make advanced phone calls to a peer system of another similarly equipped ITTDC. For example, the ITTDC provides for a local image storage and preview whereby a user of the ITTDC can capture an image and preview it before sending the image to a remote peer system. Likewise, the user can save, in a local storage, an image transferred from a remote peer system for later review. With properly integrated software for accessing an ISP, the ITTDC can exchange locally stored images as well as audio clips with an ISP server or with stored images as well as audio clips on a remote peer system connected to the Internet. Accordingly, it can free up its local storage, making itself even more powerful. When the downloaded audio clips are MP3 files, the CCITT can function as an MP3 player. The ITTDC can also function as an enhanced telephone answering machine with accompanying audios and images.

An object of the present invention is to have the ITTDC simultaneously transfer audio and image information over a ubiquitous standard telephone line without the need of any expensive equipment. In essence, the ITTDC would transfer the audio information in real-time while transferring the image information with quality on a non real-time basis.

Another object is for the ITTDC to function essentially as a digital camera with an added audio input/output device and a modem. Thus, the ITTDC can provide the complete capability of a standard digital camera with an additional ability to exchange images with a peer ITTDC or an ISP server.

A third object of the present invention is to have the ITTDC capable of making a phone call to another user of a traditional telephone and carrying on a real-time conversation with the other user.

Other objectives, together with the foregoing are attained in the exercise of the invention in the following description and resulting in the embodiment illustrated in the accompanying drawings.

BRIEF DESCRIPTION OF DRAWINGS

The current invention will be better understood and the nature of the objectives set forth above will become apparent when consideration is given to the following detailed description of the preferred embodiments. For clarity of explanation, the detailed description further makes reference to the attached drawings herein.

DETAILED DESCRIPTION OF PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessary obscuring aspects of the present invention. The detailed description is presented largely in terms of logic blocks and other symbolic representations that directly or indirectly resemble the operations of signal processing devices coupled to networks. These descriptions and representations are the means used by those experienced or skilled in the art to most effectively convey the substance of their work to others skilled in the art.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations of the invention.

For clarity of explanation, a list of abbreviations and definitions are used herein to describe the present invention and, when used hereunder, each should have the following meaning and definition in connection with the present invention: ACELP: Algebraic Code Excited Linear Prediction; ADC: analog to digital converter; AMIT: Audio Mute Image Transfer; AVI: Audio Video Interleave; CCD: charge coupled device; CDMA: combined spread spectrum code division multiple access; CMOS: Complementary Metal Oxide Semiconductor; CO: Central Office; CODEC: compression and decompression; DAC: digital to analog converter; DEMUX: demultiplexer; DRAD: Data Rate of communication for Audio; DRAM: dynamic random access memory; DRIM: Data Rate of communication for Image; DRPS: Data Rate of communication for PSTN; DSL: Digital Subscriber Line; ETS: European Telecommunication Standard; Flash Memory: a type of electrically erasable programmable read-only memory; GIF: Graphics Interchange Format; GSM: Global System for Mobile System; GSM 06.10: A European standard digital mobile telephony encoding format for cellular phone; GSM A5: GSM Ciphering Algorithm for encryption; IP-Gateway: Internet Protocol Gateway; ISDN: Integrated Services Digital Network; ISDN NT1: ISDN Network Termination 1; ISP: Internet Service Provider; ITU: International Telecommunications Union; ITU-T: ITU Telecommunication Standardization Sector; JPEG (ITU-T T.81): Joint Photographic Expert's Group; JPEG 2000 (ITU-T SG8): Joint Photographic Expert's Group 2000 LCD: liquid crystal display; LD-CELP: Low-Delay Code Excited Linear Prediction MIC: microphone; Modem: modulator demodulator; MP3: MPEG Audio Layer 3; MPEG: Moving Picture Experts Group; MP-MLQ: Multi-Pulse Maximum Likelihood Quantization; MSC: Mobile services Switching Center; NTSC: National Television Standards Committee; OSD: On Screen Display; PAL: Phase Alternate Lines; PBX: Private Branch exchange; PC: Personal Computer; PCM: Pulse Code Modulation (for digitally recorded sound); POTS: Plain Old Telephone Service; PSTN: Public Switched Telephone Network; QOS: quality of service; RS232: Radio Standard number 232, defined by Electronic Industries Association; SDRAM: synchronous dynamic random access memory; Smart Media: Smart Media cards are made of a single NAND flash chip. Formerly classified as SSFDC, these removable flash cards offer a low cost, highly portable flash solution for many digital devices wherein "SSFDC" stands for Solid State Floppy Disk Card; TDMA: Time Division Multiple Access; TIFF: Tag Image File Format; and USB: Universal Serial Bus. It should be further noted that a list of additional industry standard specification designations for ITU-T standards, which are adapted by and made applicable to the description of the present invention, is illustrated in Table I below.

TABLE I

Additional Industry Standard Specification Designations for ITU-T Standards

| | |
|---|---|
| G.711 | Pulse code modulation (PCM) of voice frequencies |
| G.723.1 | Dual rate speech coder for multimedia communications transmitting at 5.3 and 6.3 kbit/s |
| G.728 | Coding of speech at 16 kbit/s using low-delay code excited linear prediction |
| H.234 | Encryption key management and authentication system for audiovisual services |
| H.320 | Narrow-band visual telephone systems and terminal equipment (primarily ISDN) |
| H.323 | Packet-based multimedia communications systems |
| H.324 | Terminal for low bit-rate multimedia communication |
| T.120 | Data protocols for multimedia conferencing: This provides an overview of the T.120 series |
| T.123 | Protocol stacks for audiographic and audiovisual teleconference applications characterized by a real-time audio transfer but a non-sync image transfer: This specifies transport protocols for a range of networks |
| T.124 | Generic Conference Control (GCC): This defines the application protocol supporting reservations and basic conference control services for multipoint teleconferences. |
| T.125 | Multipoint Communication Service (MCS) Protocol specification: This specifies the data transmission protocol for multipoint services. |
| T.126 | Multipoint still image and annotation protocol: This defines collaborative data sharing, including white board and image sharing, graphic display information, and image exchange in a multipoint conference. |
| V.32 | A family of 2-wire, duplex modems operating at data signaling rates of up to 9600 bit/s for use on the general switched telephone network and on leased telephone-type circuits |

TABLE I-continued

Additional Industry Standard Specification Designations for ITU-T Standards

| | |
|---|---|
| V.32bis | A duplex modem operating at data signaling rates of up to 14400 bit/s for use on the general switched telephone network and on leased point-to-point 2-wire telephone-type circuits |
| V.34 | A modem operating at data signaling rates of up to 33600 bit/s for use on the general switched telephone network and on leased point-to-point 2-wire telephone-type circuits |
| V.90 | A digital modem and analogue modem pair for use on the Public Switched Telephone Network (PSTN) at data signaling rates of up to 56000 bit/s downstream and up to 33600 bit/s upstream |
| V.92 | Enhancements to Recommendation V.90 |

Figure 1:
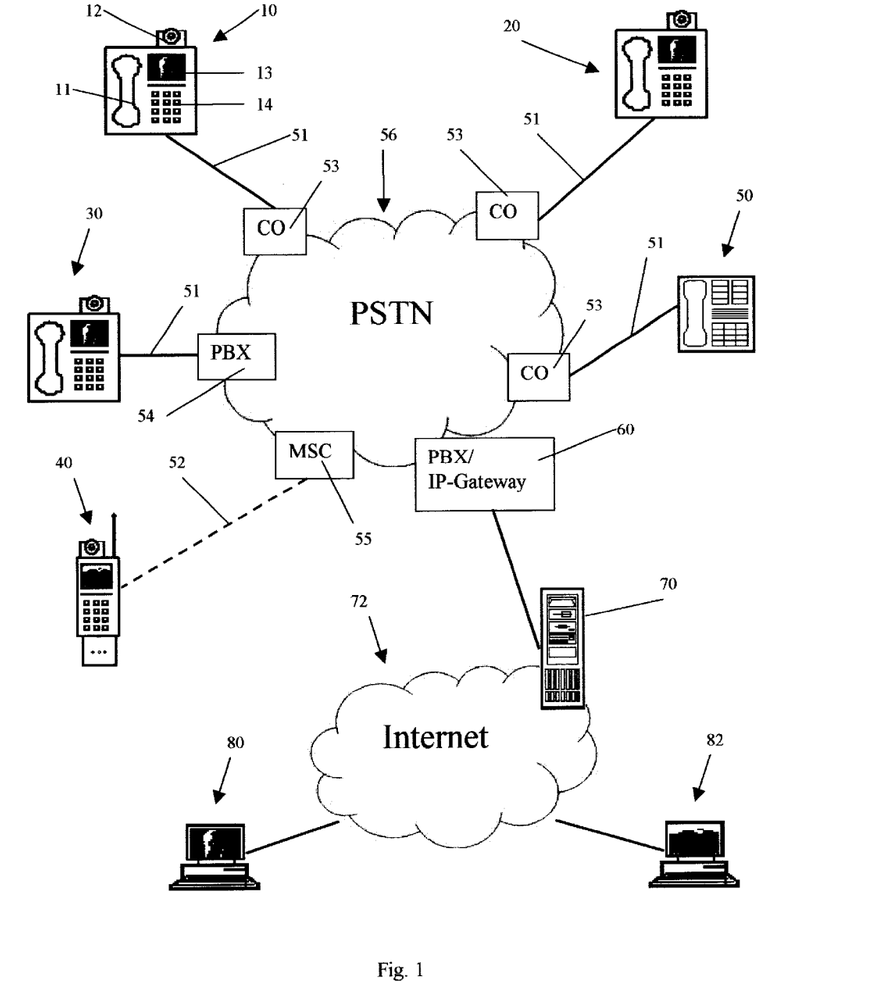
FIG. 1 illustrates the application environment of the ITTDC.

FIG. 1 illustrates the application environment of the ITTDC. ITTDC-A 10 comprises an integrated telephone front end 11, an image input camera 12, an image display 13 and user controls 14. ITTDC-A 10 further comprises, not shown in this figure although it will be presently discussed, a built-in means for accessing a PSTN 56 by communicating with a central office 53 through telephone lines 51. ITTDC-B 20 is a similarly equipped unit of the present invention that also accesses the PSTN 56. ITTDC-C 30 is another similarly equipped unit of the present invention except that ITTDC-C 30 accesses the PSTN 56 by communicating with a PBX 54 through telephone lines 51. ITTDC-D 40 is a third similarly equipped unit of the present invention except that ITTDC-D 40 is implemented in the form of a wireless phone hence accessing the PSTN 56 by communicating with an MSC 55 through a wireless communication path 52. Although not specifically illustrated, by now it should be obvious that the ITTDC of the present invention can be implemented in the form of a cordless phone. A traditional telephone 50 is also illustrated accessing the PSTN 56 by communicating with a central office 53 through telephone lines 51. An ISP server 70 simultaneously accesses the PSTN 56 through a PBX/IP Gateway 60 and the Internet 72 having, as another illustration, its own accessing electronic device-A 80 and electronic device-B 82.

Thus, a user-A (not shown) of ITTDC-A 10 can make a phone call to a user-B (not shown) of ITTDC-B 20 through the PSTN 56, automatically setting up a digital connection between the PSTN access means of the respective ITTDCs, and can carry on a real-time conversation with user-B while exchanging a digital image captured with the image input camera 12 of ITTDC-A 10 with user-B on a non real-time basis. Similarly, user-A of ITTDC-A 10 can make a phone call to a user-D (not shown) of ITTDC-D 40 through the PSTN 56, automatically setting up a digital connection between the PSTN access means of the respective ITTDCs, and can carry on a real-time conversation with user-D while exchanging a digital image captured with the image input camera 12 of ITTDC-A 10 with user-D on a non real-time basis. While it is transparent to user-A, the only difference here is that ITTDC-D 40 is implemented in the form of a wireless phone hence accessing the PSTN 56 by communicating with an MSC 55 through a wireless communication path 52. Next, a user-C (not shown) of ITTDC-C 30 can make a phone call to the ISP server 70 through the PSTN 56 and the PBX/IP Gateway 60, automatically setting up a digital connection with the Internet 72, and can exchange locally stored images as well as audio clips on ITTDC-C 30 with their counterpart remotely stored images as well as audio clips on the electronic device-A 80 or on the electronic device-A 82. However, if the peer system is a user-E (not shown) of the traditional telephone 50, user-A of ITTDC-A 10, after making a phone call to user-E, will automatically set up a traditional analog connection via the PSTN access means and can carry on a real-time conversation with user-E. Next, as an illustrated option of the ITTDC, ITTDC-A 10 can be remotely monitored, with accompanying audio and image feedback, by user-A dialing in through ITTDC-C 30 and followed by inputting a proper password or a special key sequence. Certainly, ITTDC-A 10 can function, with the added functionality from the image input camera 12, the image display 13 and PSTN access means, as an enhanced telephone answering machine with accompanying audios and images. ITTDC-A 10 can also function as a digital camera capable of exchanging locally captured and stored images with a remote communication partner such as user-C of ITTDC-C 30.

Figure 2:
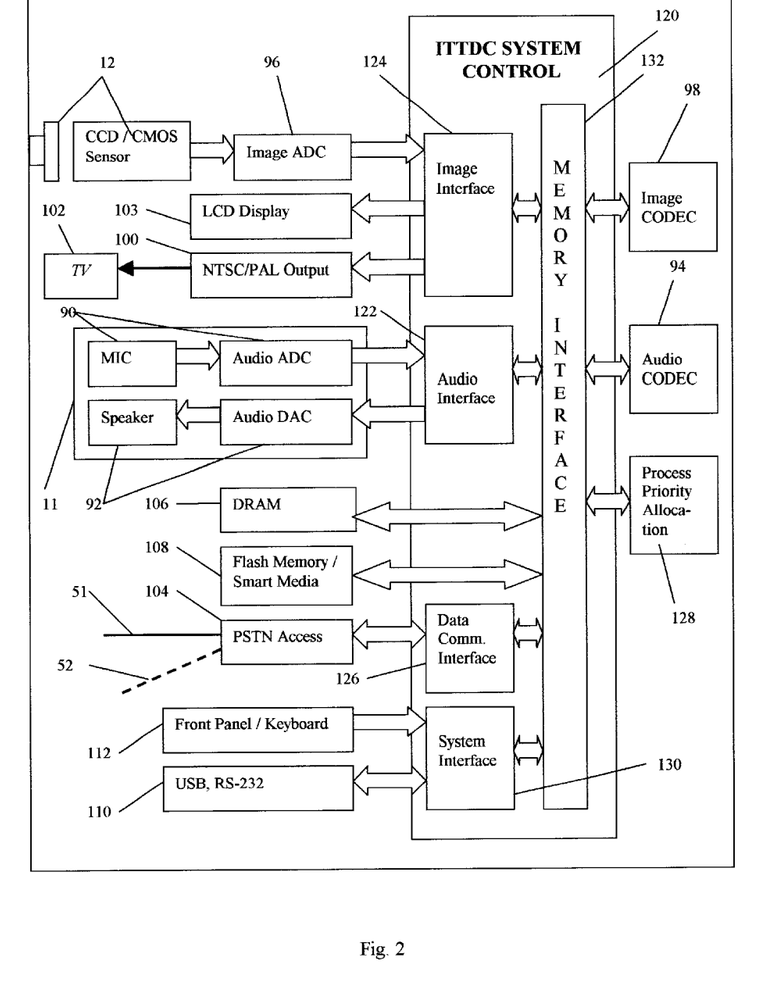
FIG. 2 details a hardware architecture of the ITTDC.

FIG. 2 details a hardware architecture of the present invention ITTDC having an integrated telephone front end 11, which further comprises an audio input means 90 and an audio playback means 92. The audio input means 90, comprising an MIC and a following audio ADC, functions to convert an input audio from a user of the ITTDC into an uncompressed digital inbound audio data stream. The audio playback means 92, comprising an audio DAC and a following speaker, functions to convert an uncompressed digital receiving audio data stream into a corresponding audible sound for the user of the ITTDC Both the audio input means 90 and the audio playback means 92 functionally coordinate with an audio interface 122 for an additional upstream data processing. Next, an image input camera 12 (with an integrated CCD/CMOS sensor) together with a following image ADC 96 form an image input means for capturing and converting a physical image into an uncompressed digital inbound image data frame. A TV 102 driven by a NTSC/PAL Output 100 or, alternatively, an LCD Display 103 constitutes an image display means for converting an uncompressed digital receiving image data frame into a corresponding visible image display for a user of the ITTDC. Both the image display means and the image input means functionally coordinate with an image interface 124 for an additional upstream data processing.

Next, a PSTN access device 104 is provided for, through either the telephone lines 51 or the wireless communication path 52, concurrently converting a digital outbound data stream into a suitable analog signal waveform for reliable transmission to the PSTN 56 and concurrently converting an analog inbound signal waveform from the PSTN 56 into a corresponding digital inbound data stream. The PSTN access device 104 functionally coordinates with a data communication interface 126 for an additional upstream data processing. Notice that, to achieve a secured communication between a user of the ITTDC and his communication partner, the data communication interface 126 can further include an optional data encryption and decryption function based upon a custom algorithm or selected from these industry standards: H.233, H.234 and GSM A5.

To be compatible with a variety of industry standard communication devices the PSTN access device 104 is made compatible with the following communication standards:
1. Voice-band modem on POTS wired lines with data rate from 9.6 Kbps (Kilobits/sec) to 56 Kbps (V.92, V.90, V.34, V.32/V.32bits).
2. ISDN NT1 access: 128 Kbps 2B+D (two 64 Kbps B-Channels and one 16 Kbps D-Channel).
3. DSL modem access: typical 640K download, 272K upload (limited to within two to three miles from Central Office—USWest modem).

4. Wireless/Cellular access: Current popular $2^{nd}$ generation digital wireless/cellular access via GSM/TDMA/CDMA (around 9.6 Kbps or 8 Kbps to 14 Kbps depending upon specific implementation), possible future $3^{rd}$ generation digital wireless/cellular access via CDMA++, GSM++ or TDMA++ (384 Kbps to 2 Mbps(Megabits/sec)).

Of course, the operating data rate, DRPS, of communication for the PSTN access device 104 and all other associated communication parameters are negotiated and can be dynamically modified between a user of the ITTDC and his communication partner through the PSTN access device 104. Additionally, to insure backward compatibility with the traditional telephone 50, the PSTN access device 104 is provided with a function of automatic switching between digital and analog modes. Thus, as all the above communication standards and POTS can already freely exchange speech conversation amongst them, by combining the PSTN access device 104 with an appropriate operating software, to be presently presented, the various ITTDC units can not only make speech conversation amongst them, but also exchange image information and any other multi-media files (including AVI and MP3 files). Depending upon the technology of microchip integration, the PSTN access device 104 can even be implemented in pure software form. Finally, multiple units of PSTN access device 104 can be incorporated in a single ITTDC so as to enable the function of multi-party conference calls.

Referring still to FIG. 2, a local data read and write means, comprising DRAM 106 and Flash memory/Smart Media 108, is provided for storing an embedded system control software with associated control data, permanent ITTDC operating parameters as well as a temporarily or permanently stored a compressed digital outbound audio data stream, a compressed digital inbound audio data stream, a compressed digital outbound image data frame and a compressed digital inbound image data frame. More specifically, the DRAM 106 serves as the place for the operation of the embedded system control software and for any temporary storage of the process buffer for audio and image data. The Flash memory/Smart Media 108 serves as the place where the embedded system control software code resides as well as a permanent storage for ITTDC control data, audio and image data.

Referring still to FIG. 2, an optional electronic interface 110 can be provided for communication with other electronic devices locally attached to the ITTDC. Two popular candidates are USB and RS232. The optional electronic interface 110 functionally coordinates with a system interface 130 for an additional upstream data processing.

Referring still to FIG. 2, a user controls 112 is provided for accepting various user controls of the ITTDC to direct its operations. Like the optional electronic interface 110, the user controls 112 functionally coordinate with the system interface 130 for an additional upstream data processing. Naturally, the user controls 112 contain a variety of front panel keys array, display indicators and standard phone keys. Additionally, for the operational control of the image input camera 12 and the image display 13, the user controls 112 should also contain standard digital camera control keys and image display control keys, standard phone keys, digital 0–9, *, #, Redial, Mute, etc. Importantly, the selection of audio quality, image resolution and related compression ratios can be implemented via selection keys or, equivalently, via an option in a separate software setup menu. Optional keys for a standard answer machine can also be included. For the purpose of illustration, the following lists some examples of user controls 112:

Camera Keys: Capture/Preview, Previous, Next, etc.

LCD/TV related keys: "Selection" button for "view LOCAL" or "view REMOTE", or "Split Display" for "side-by-side" or "PIP" (picture in picture) viewing, Selection, Zoom, etc.

Standard answering machine keys: Record, Play, etc.

Audio Quality Selection: Normal Audio Mode, Good Audio Mode, Auto Audio Mode, etc.

System setting keys: Image Resolution Selections (multiple selection keys). Can be 320×240, 640×480, 1024×768, etc.

Image Compression ratio Selection. Can be: No compression, 1:4, 1:8, 1:15, etc.

Referring still to FIG. 2, an audio CODEC 94 is provided for concurrently compressing an uncompressed digital inbound audio data stream into a compressed digital outbound audio data stream and concurrently decompressing a compressed digital inbound audio data stream into an uncompressed digital receiving audio data stream. For maximum operational flexibility, the audio CODEC 94 has a number of selectable, audio compression plans with a corresponding number of graduations of audio quality each with its respective data rate of communication for the audio CODEC 94 (DRAD). Specifically, Table II lists a series of audio compression plans that are generally accepted as industry standards and made applicable to the present invention.

TABLE II

Industry Standard Audio CODEC Compression Plans

| Audio format | Data Rate* | Compression Ratio | Audio Quality |
|---|---|---|---|
| 16-bit PCM (Raw Data) | 128 Kbps | 1:1 | Best |
| G.711 | 64 Kbps | 1:2 | Better |
| G.728 | 16 Kbps | 1:8 | Good |
| G.723.1 | 6.3/5.3 Kbps | 1:20/1:24 | Normal |
| GSM 06.10 | 13.2 Kbps | 1:9.7 | Normal |

*Remark: Data Rate is calculated based upon a mono audio with a sampling rate of 8 KHz.

An additional audio compression plan, corresponding to an industry standard MP3 audio file format, is also included to make the ITTDC function as an MP3 player where the MP3 audio files can be downloaded from the ISP server by the ITTDC. In this case, of course, the ITTDC must have provisions to support the MP3 decode.

Next, an image CODEC 98 is provided for concurrently compressing an uncompressed digital inbound image data frame into a compressed digital outbound image data frame and concurrently decompressing a compressed digital inbound image data frame into an uncompressed digital receiving image data frame. For maximum operational flexibility, the image CODEC 98 also has a number of selectable, image compression ratios with a corresponding number of graduations of image quality each with its associated data rate of communication for the image CODEC 98 (DRIM). For maximum operational flexibility, the image CODEC 98 has a number of selectable, through the user controls 112, image compression plans with a corresponding number of graduations of image quality each with its associated data rate of communication for the image CODEC 98 (DRIM). Specifically, the image compression plans are listed in the following Table III, which are considered industry standards and made applicable to the present invention.

TABLE III

Industry Standard Image CODEC Compression Plans

|  | Compression Ratio | Image Quality | Multi-frame |
|---|---|---|---|
| JPEG | 1:4~1:30 | Best~Good | No |
| JPEG 2000 | 1:4~1:50 | Best~Good | Yes |
| TIFF | ~1:1 | Best | No |
| Motion JPEG | 1:4~1:30 | Best~Good | Yes |
| GIF | ~1:30 | Good | Yes |

Likewise, the corresponding industry standard image resolutions, which are readily adaptable to the present invention, are as follows: 320×240, 640×480, 800×600, 1024×768, 1280×1024 (1.3M camera), 1600×1200 (1.92M), 2048×1536 (3.14M), 2288×1712 (3.9M), 2560×1920 (4.92M), 3040×2008 (6.1M), etc.

Another important remark is that, the audio CODEC 94, the image CODEC 98, together with an image sampling and processing operation as well as an audio sampling and processing operation, will also support the encoding and decoding of Microsoft AVI file format. Of course, these files can only be recorded or played when the ITTDC is not engaged in an audio conversation. Under this condition, the AVI files can be exchanged as a pre-recorded image saved on the Flash memory/Smart Media 108 or DRAM 106. This functionality is similar to what is available from some advanced digital camera like the Nikon—CoolPix 4500.

Referring still to FIG. 2, a system control 120 is provided that in turn comprises the audio interface 122, the image interface 124, the system interface 130, a process priority allocation 128 and a memory interface 132. The audio interface 122 functions to activate the audio input means 90 thus inputting a corresponding uncompressed digital inbound audio data stream and to activate the audio playback means 92 thus outputting a corresponding uncompressed digital receiving audio data stream. The image interface 124 functions to activate the image input means thus inputting a corresponding uncompressed digital inbound image data frame and functions to activate the image display means thus outputting a corresponding uncompressed digital receiving image data frame. The system interface 130 functions to monitor user controls through the user controls 112 as well as communicating with other locally attached electronic devices through the optional electronic interface 110. The process priority allocation 128 acts, with related details to be presented in FIGS. 3A, 3B, 4A, 4B, 5A and 5B, to pack or unpack a compressed digital outbound audio data stream, a compressed digital inbound audio data stream, a compressed digital outbound image data frame and a compressed digital inbound image data frame for the data communication interface 126. The process priority allocation 128 can be implemented with an industry standard T.123 transfer protocol or similar transfer protocols wherein the processing of audio information is assigned a highest priority while the processing of image information is assigned a lower priority. The memory interface 132, being the hardware core of the system control 120, functions to interface with the audio interface 122, the image interface 124, the audio CODEC 94, the image CODEC 98, the DRAM 106, the Flash memory/Smart Media 108, the data communication interface 126, the process priority allocation 128 and the system interface 130. FIGS. 3A, 3B, 4A, 4B, 5A and 5B detail a corresponding embedded system control software architecture of the present invention ITTDC.

Figure 3A:
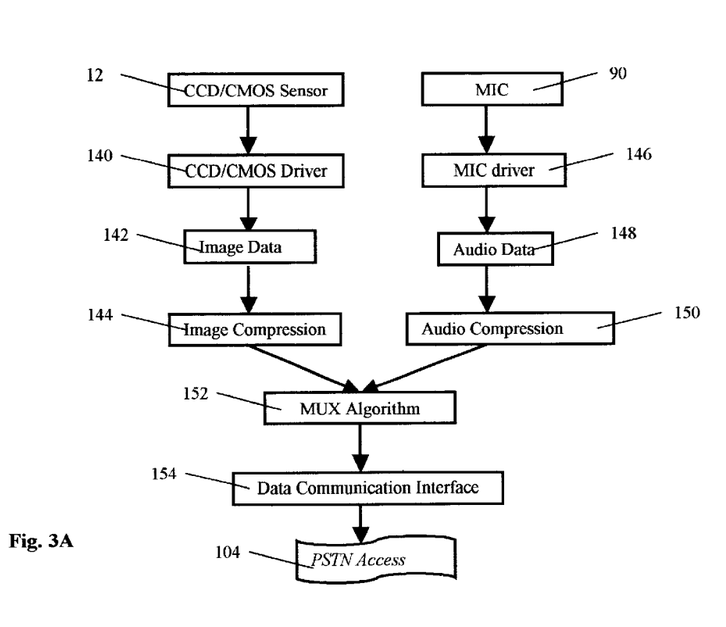
FIG. 3A and FIG. 3B detail the software flowcharts for the processing of audio and image information within the ITTDC.
Figure 3B:
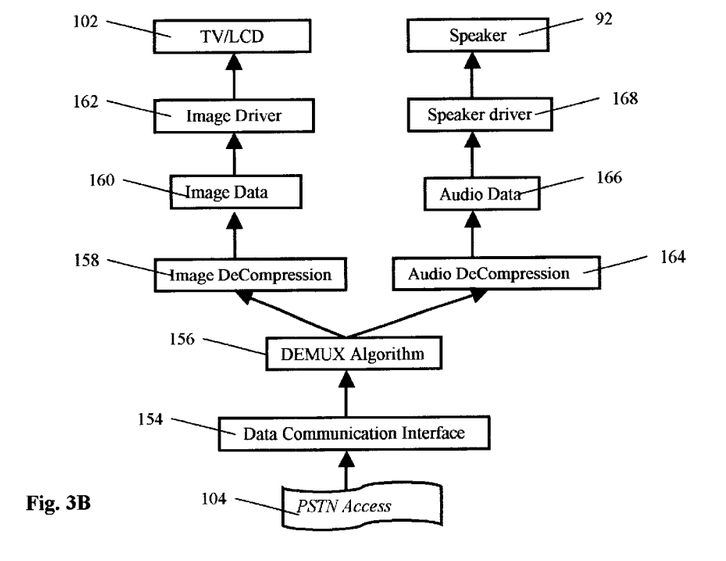

Referring jointly to FIG. 3A and FIG. 3B, the software flowcharts for the overall processing of audio and image information within the ITTDC are illustrated. In FIG. 3A, a MIC driver 146 collects real-time audio data 148 from the audio input means 90. An audio compression 150 operation is then performed on the collected real-time audio data 148 with the resulting outbound compressed audio data further multiplexed with a separate outbound compressed image data using a MUX algorithm 152 to form an audio/image multiplexed (AI-MUX) outbound data stream to be outputted, via a data communication interface driver 154, through the PSTN access device 104. In parallel, a CCD/CMOS driver 140 collects image data 142 from the image input camera 12. An image compression 144 operation is then performed on the collected image data 142 with the resulting outbound compressed image data further multiplexed with a separate outbound compressed audio data using the same MUX algorithm 152, etc. In FIG. 3B, the data communication interface driver 154 collects an AI-MUX inbound compressed data stream through the PSTN access device 104 with the collected AI-MUX inbound compressed data stream demultiplexed into separate compressed audio and compressed image data streams by a DEMUX algorithm 156. Subsequently, an audio decompression 164 operation decompresses the compressed audio data stream into an uncompressed audio data 166 that is in turn sent to the audio playback means 92 by a speaker driver 168 for playback. In parallel, an image decompression 158 operation decompresses the compressed image data stream into an uncompressed image data 160 that is in turn sent to the TV 102 (or the LCD Display 103) by an image driver 162 for viewing by a user of the ITTDC. It is important to point out that, to maintain consistency of data communication throughput, the data rate of communication for the audio CODEC 94, DRAD, must be set to a value that is less than or equal to the data rate of communication for the PSTN access device 104, DRPS. Furthermore, the associated data rate of communication for the image CODEC 98, DRIM, must also satisfy the following condition:

$$\text{maximum possible DRIM} = \text{DRPS} - \text{DRAD}$$

With the above condition satisfied, the embedded system control software further includes an automatic audio data rate allocation strategy, tied in to a set of user-selectable audio modes, to achieve an optimized mix of audio and image quality consistent with the DRPS, as follows:

1. Good Audio Mode: Regardless of the value of DRPS, allocate the most DRAD (for example G.728 at 16 Kbps) to audio.
2. Normal Audio Mode: Regardless of the value of DRPS, allocate the least DRAD (for example G.723.1 at 6.3 Kbps) to audio.
3. Auto Audio Mode: When DRPS is high, for example greater than or equal to 33.6 Kbps, allocate a higher DRAD than its Normal Audio Mode value to audio. While DRPS is low, for example less than 33.6 Kbps, allocate a lower DRAD than its Normal Audio Mode value to audio.
4. Best Audio Mode: set DRAD equal to G.711 at 64 Kbps.
5. Audio Mode Overwrite: Regardless of the value of the local setting, the real operational DRAD is negotiated during the connection setup phase wherein the lower DRAD of the two peer ITTDCs will be adopted.

Figure 4A:
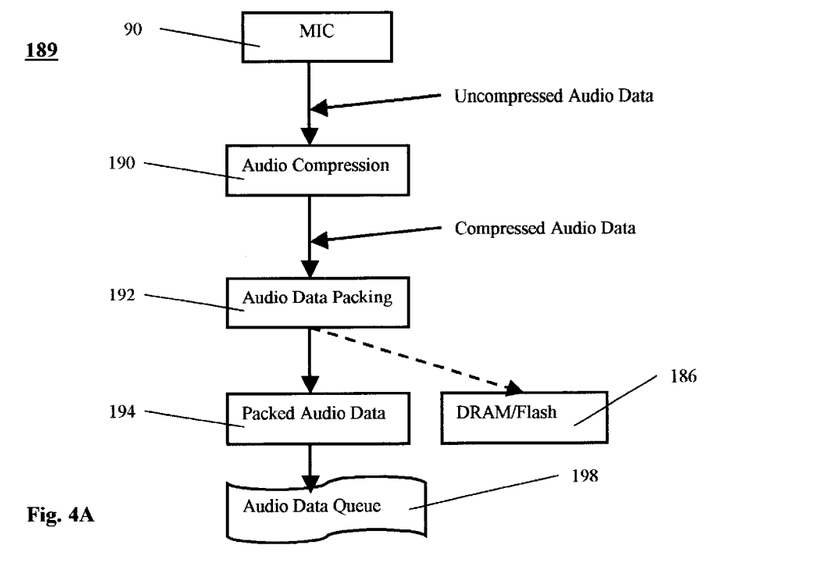
FIG. 4A and FIG. 4B detail the software flowcharts for an audio sampling and processing operation and an image capturing and processing operation of the embedded system control software.
Figure 4B:
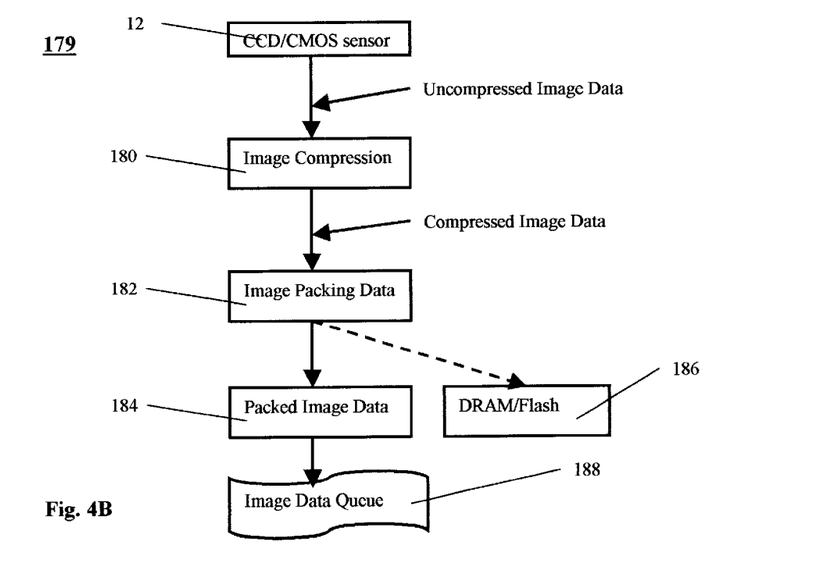

FIG. 4A and FIG. 4B detail the software flowcharts for an audio sampling and processing operation and an image capturing and processing operation of the embedded system control software. In FIG. 4A, an audio sampling and processing operation 189 continuously samples, as long as the integrated telephone front end 11 is turned on, an uncompressed audio data input from a user through the audio input means 90 followed by an audio compression 190 operation then an audio data packing 192 operation. The packed audio data 194 is either forwarded on to an audio data queue 198 for an immediate transmission or, upon demand by a user of the ITTDC and following the direction of a dashed arrow, is placed in a DRAM/Flash 186 for later review. In FIG. 4B, an image sampling and processing operation 179 occasionally captures, upon demand by a user of the ITTDC, an uncompressed image data input from a user through the image input camera 12 followed by an image compression 180 operation then an image data packing 182 operation. The packed image data 184 is either forwarded on to an image data queue 188 for a later transmission or, upon demand by a user of the ITTDC and following the direction of a dashed arrow, is placed in the DRAM/Flash 186 for later review. As some of the supported DRPS by the PSTN access device 104 is quite slow (for example 9.6 Kbps), the embedded system control software is designed to have another Audio Mute Image Transfer (AMIT) mode that can transfer the optional AVI and MP3 files. Briefly, the AMIT mode is now described.

When an image transfer process gets initiated via the user controls 112, any audio information processing will be muted to save the whole DRPS for the image transfer process. Of course, the user controls 112 should support an interrupting audio un-muting function at any time regardless of the ongoing image transfer process. The AMIT mode can also be implemented via some smart "Voice Activity Detection" to automatically mute and un-mute the audio information processing thus optimally utilizing the low DRPS. As a reference information, it is a known fact in the art that a person speaks less than 40% of the time in a normal conversation.

Figure 5A:
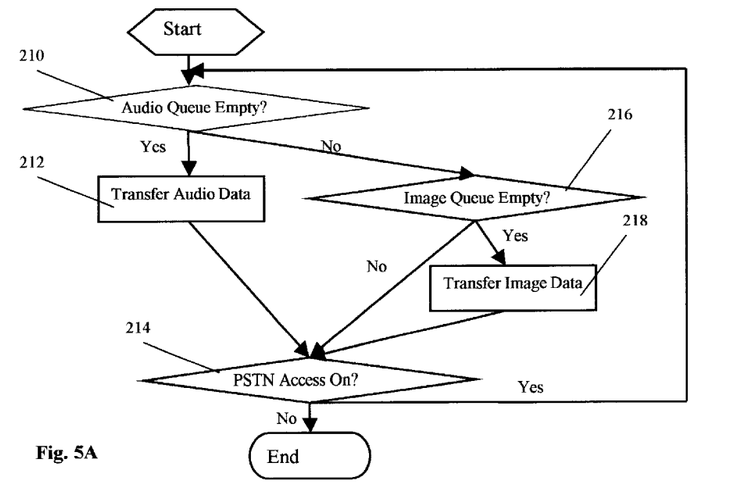
FIG. 5A and FIG. 5B detail processing priority control flowcharts for allocating a highest priority to tasks for inputting and outputting audio information while allocating a lower priority to tasks for inputting and outputting image information.
Figure 5B:
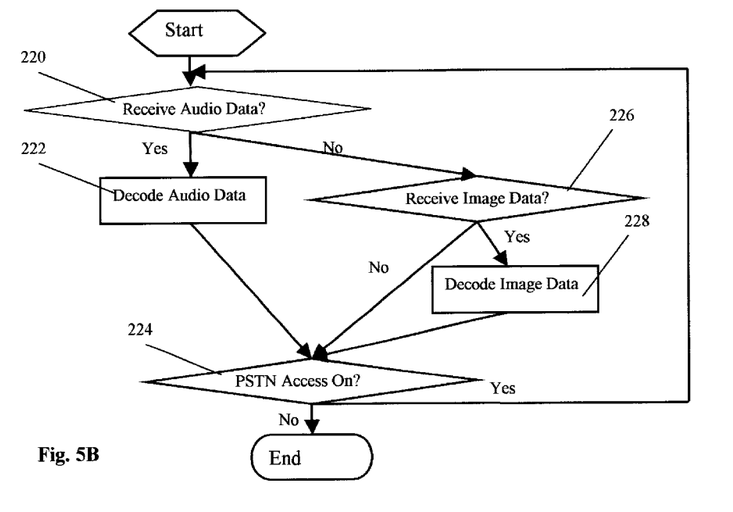

FIG. 5A and FIG. 5B detail processing priority control flowcharts for allocating a highest priority to tasks for inputting and outputting audio information while allocating a lower priority to tasks for inputting and outputting image information. These flowcharts actually represent a simplified version of an industry standard T.123 protocol that defines four (4) priority logical channels in one physical connection. Thus, FIG. 5A, being a MUX algorithm 152, deals with the outputting, or multiplexing, of audio and image data by first processing a step named audio queue empty ? 210. If the answer is "Yes" an immediate step of transfer audio data 212 is performed and the whole operation repeats again with the step audio queue empty ? 210 if the PSTN access device 104 is connected (answer to step PSTN Access connected ? 214 is "Yes"). Only upon receiving an answer of "No" to the step audio queue empty ? 210 would a similar process dealing with the transfer of image data take place (steps 216 and 218). FIG. 5B, being a DEMUX algorithm 156, deals with the inputting, or demultiplexing, of audio and image data by first processing a step named receive audio data ? 220. If the answer is "Yes" an immediate step of decode audio data 222 is performed and the whole operation repeats again with the step receive audio data ? 220 if the PSTN access device 104 is connected (answer to step PSTN Access connected ? 224 is "Yes"). Only upon receiving an answer of "No" to the step receive audio data ? 220 would a similar process dealing with the receiving of image data take place (steps 226 and 228). In essence, the processing priority control allocates a highest priority to tasks performed by the audio sampling and processing operation 189 whereas a lower priority to tasks performed by the image sampling and processing operation 179 thus guaranteeing a real-time processing of audio information while preserving a correspondingly leftover communication bandwidth for a non real-time processing of image information.

FIG. 6A, FIG. 6B, FIG. 6C and FIG. 6D present a set of ITTDC performance characteristics expressed in terms of data rate of communication for the PSTN access (DRPS), audio quality, data rate of communication for the audio CODEC (DRAD), audio bandwidth usage, image quality and image transfer time. As a reference, the image transfer time is calculated based upon the following formula:

Image Transfer Time (sec)=(total number of pixels in an image*24 bits_per_pixel* compression_ratio)/DRIM (bps)

Figure 6A:
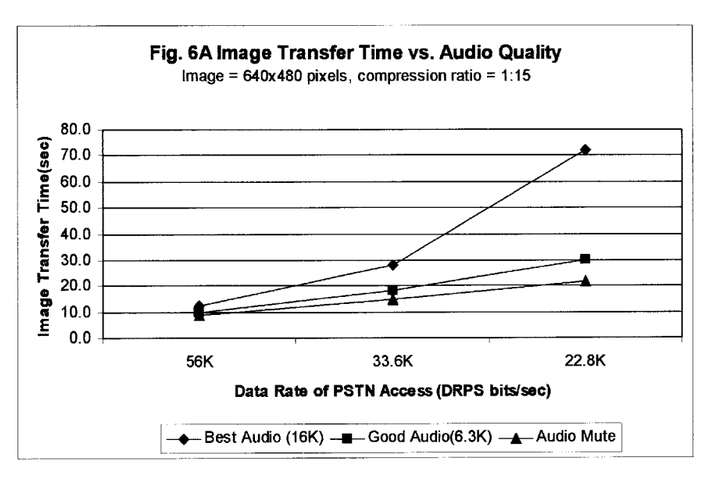
FIG. 6A, FIG. 6B, FIG. 6C and FIG. 6D present a set of ITTDC performance characteristics expressed in terms of PSTN access data rate, audio quality, audio data rate, audio bandwidth usage, image quality and image transfer time.
Figure 6B:
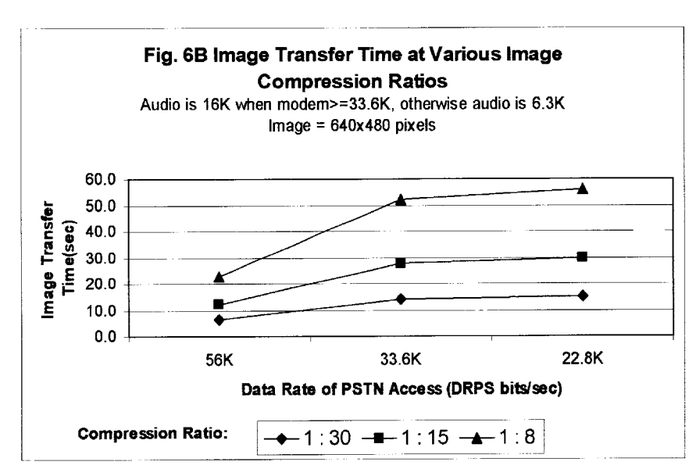
Figure 6C:
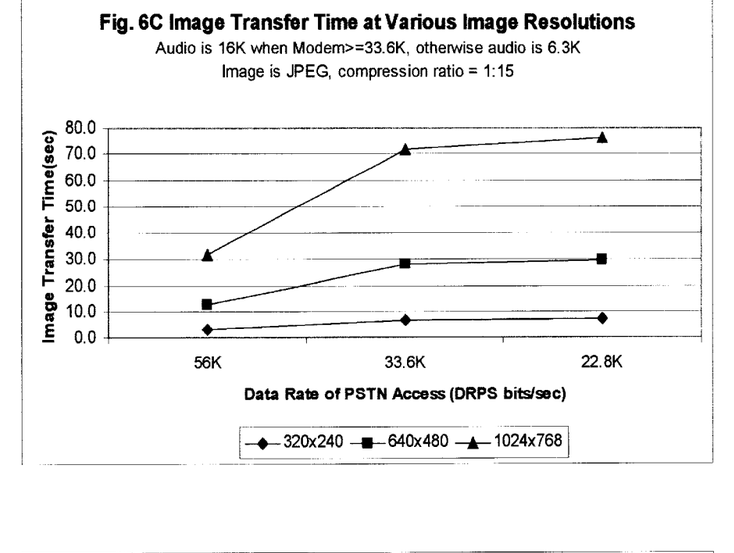

FIG. 6A is a family plot of image transfer time, for a 640×480 pixel image with a 1:15 compression ratio, vs. DRPS at three levels of simultaneously transmitting audio qualities. For example, at a DRPS of 56 Kbps with a Best Audio, the image transfer time is only about 13 seconds. However, at a DRPS of 22.8 Kbps with the same Best Audio, the image transfer time is now about 73 seconds. FIG. 6B is a family plot of image transfer time, for a 640×480 pixel image with an accompanying audio of various qualities, vs. DRPS at three levels of image compression ratio. For example, at a DRPS of 56 Kbps with a Best Audio and using an image compression ratio of 1:30, the image transfer time is only about 6 seconds. However, at a DRPS of 22.8 Kbps with a Good Audio and using an image compression ratio of 1:8, the image transfer time is now about 56 seconds. FIG. 6C is a family plot of image transfer time, for an image of various resolutions with an accompanying audio of various qualities, vs. DRPS at three levels of image resolutions. For example, at a DRPS of 56 Kbps with a Best Audio, the image transfer time for a 320×240 pixel image compressed with a ratio of 1:15 is only about 3 seconds. However, at a DRPS of 22.8 Kbps with a Good Audio, the image transfer time for a 1024×768 pixel image compressed with the same ratio of 1:15 is now about 76 seconds.

Figure 6D:
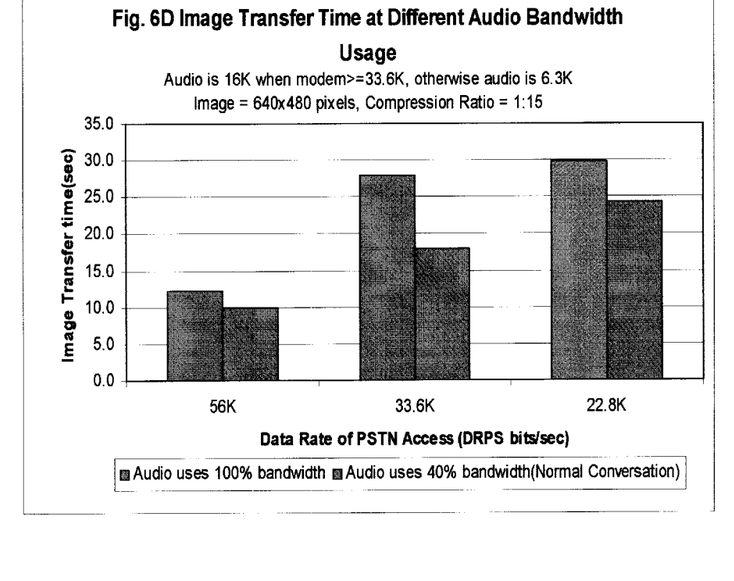

For those skilled in the art, the above calculation should be understood to be only an approximation as, in practice, there will be various factors causing a loss of image bandwidth, for example, due to frame packaging, error correction, etc. On the other hand, since image is transferred using the leftover bandwidth after an audio transfer and, in a normal conversation, people only talk during less than 40% of the time. This means that the extra 60% bandwidth can be used for image transfer. Thus, correspondingly, FIG. 6D demonstrates that how image transfer time can be greatly reduced by taking advantage of this fact. For example, at a DRPS of 33.6 Kbps with Good Audio, the image transfer time for a 640×480 pixel image compressed with a ratio of 1:15 is 28 seconds. However, with the extra 60% bandwidth for image transfer, it now only takes about 18 seconds. That is, the new DRIM is calculated as follows:

new DRIM=DRPS−(DRAD*40%)

The present invention has been described using exemplary preferred embodiments for an Image Transceiving Telephone with Integrated Digital Camera (ITTDC) for simultaneous transceiving of real-time audio and non-real time image through a Public Switched Telephone Network (PSTN). However, for those skilled in this field, the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

What is claimed is:

1. An Image Transceiving Telephone with Integrated Digital Camera (ITTDC) for simultaneous transmission and receiving (transceiving) of real-time audio and non-real time image through a Public Switched Telephone Network (PSTN), the ITTDC comprising:

an integrated telephone front end further comprising:
an audio input means for converting an input audio from a user of said ITTDC into an uncompressed digital inbound audio data stream and
an audio playback means for converting said uncompressed digital receiving audio data stream into a corresponding audible sound for the user of said ITTDC;
an audio CODEC (compression and decompression) for concurrently compressing said uncompressed digital inbound audio data stream into a compressed digital outbound audio data stream and concurrently decompressing a compressed digital inbound audio data stream into an uncompressed digital receiving audio data stream;
an image input means for capturing and converting an image into an uncompressed digital inbound image data frame;
an image CODEC for concurrently compressing said uncompressed digital inbound image data frame into a compressed digital outbound image data frame and concurrently decompressing a compressed digital inbound image data frame into an uncompressed digital receiving image data frame;
an image display means for converting said uncompressed digital receiving image data frame into a corresponding visible image display for the user of said ITTDC;
a PSTN access means for concurrently converting a digital outbound data stream into a suitable analog signal waveform for reliable transmission through said PSTN and concurrently converting an analog inbound signal waveform from said PSTN into a corresponding digital inbound data stream wherein said PSTN access means is further provided with an operating data rate of communication ("DRPS") for communicating with all other associated communication parameters between a user of said ITTDC and said user's communication partner and wherein said PSTN access means is further coordinating with said audio CODEC having a number of selectable audio compression plans to select a corresponding number of graduations of audio quality, each with its associated data rate of communication for said audio CODEC (DRAD), such that the DRAD is less than or equal to said DRPS between a user of said ITTDC and a communication partner of said user through said PSTN;
a local data read and write means for storing an embedded system control software with associated control data, permanent ITTDC operating parameters as well as temporarily or permanently storing said compressed digital outbound audio data stream, said compressed digital inbound audio data stream, said compressed digital outbound image data frame and said compressed digital inbound image data frame;
an optional electronic interface means for communication with other electronic devices locally attached to the ITTDC;

a user-control means for accepting user controls of the ITTDC directing its operations;
a system control means for interfacing with and further controlling said integrated telephone front end, said audio CODEC, said image input means, said image CODEC, said image display means, said PSTN access means, said local data read and write means, said optional electronic interface means and said user-control means to perform a plurality of desirable functions with respect to said simultaneous transmission and receiving (transceiving) of real-time audio and non-real time image; and
wherein said audio compression plans come from a set of industry standards selected from the group consisting of the following plans:

| Audio format | Data Rate | Compression Ratio | Audio Quality |
|---|---|---|---|
| 16-bit PCM (Raw Data) | 128 Kbps | 1:1 | Best |
| G.711 | 64 Kbps | 1:2 | Better |
| G.728 | 16 Kbps | 1:8 | Good |
| G.723.1 | 6.3/5.3 Kbps | 1:20/1:24 | Normal |
| GSM 06.10 | 13.2 Kbps | 1:9.7 | Normal. |

2. An Image Transceiving Telephone with Integrated Digital Camera (ITTDC) for simultaneous transmission and receiving (transceiving) of real-time audio and non-real time image through a Public Switched Telephone Network (PSTN), the ITTDC comprising:

an integrated telephone front end further comprising:
an audio input means for converting an input audio from a user of said ITTDC into an uncompressed digital inbound audio data stream and
an audio playback means for converting said uncompressed digital receiving audio data stream into a corresponding audible sound for the user of said ITTDC;
an audio CODEC (compression and decompression) for concurrently compressing said uncompressed digital inbound audio data stream into a compressed digital outbound audio data stream and concurrently decompressing a compressed digital inbound audio data stream into an uncompressed digital receiving audio data stream wherein said audio CODEC further supports a decoding of MP3 audio files making the ITTDC function as a MP3 player of downloadable MP3 audio files from an ISP by the ITTDC;
an image input means for capturing and converting an image into an uncompressed digital inbound image data frame;
an image CODEC for concurrently compressing said uncompressed digital inbound image data frame into a compressed digital outbound image data frame and concurrently decompressing a compressed digital inbound image data frame into an uncompressed digital receiving image data frame;
an image display means for converting said uncompressed digital receiving image data frame into a corresponding visible image display for the user of said ITTDC;
a PSTN access means for concurrently converting a digital outbound data stream into a suitable analog signal waveform for reliable transmission through said PSTN and concurrently converting an analog inbound signal waveform from said PSTN into a corresponding digital inbound data stream wherein said PSTN access means is further provided with an operating data rate of communication ("DRPS") for communicating with all other associated communication parameters between a user of said ITTDC and said user's communication partner and wherein said PSTN access means is further coordinating with said audio CODEC having a number of selectable audio compression plans to select a corresponding number of graduations of audio quality, each with its associated data rate of communication for said audio CODEC (DRAD), such that the DRAD is less than or equal to said DRPS between a user of said ITTDC and a communication partner of said user through said PSTN;

a local data read and write means for storing an embedded system control software with associated control data, permanent ITTDC operating parameters as well as temporarily or permanently storing said compressed digital outbound audio data stream, said compressed digital inbound audio data stream, said compressed digital outbound image data frame and said compressed digital inbound image data frame;

an optional electronic interface means for communication with other electronic devices locally attached to the ITTDC;

a user-control means for accepting user controls of the ITTDC directing its operations; and a system control means for interfacing with and further controlling said integrated telephone front end, said audio CODEC, said image input means, said image CODEC, said image display means, said PSTN access means, said local data read and write means, said optional electronic interface means and said user-control means to perform a plurality of desirable functions with respect to said simultaneous transmission and receiving (transceiving) of real-time audio and non-real time image.

3. An Image Transceiving Telephone with Integrated Digital Camera (ITTDC) for simultaneous transmission and receiving (transceiving) of real-time audio and non-real time image through a Public Switched Telephone Network (PSTN), the ITTDC comprising:

an integrated telephone front end further comprising:
  an audio input means for converting an input audio from a user of said ITTDC into an uncompressed digital inbound audio data stream and
  an audio playback means for converting said uncompressed digital receiving audio data stream into a corresponding audible sound for the user of said ITTDC;
  an audio CODEC (compression and decompression) for concurrently compressing said uncompressed digital inbound audio data stream into a compressed digital outbound audio data stream and concurrently decompressing a compressed digital inbound audio data stream into an uncompressed digital receiving audio data stream;

an image input means for capturing and converting an image into an uncompressed digital inbound image data frame;

an image CODEC for concurrently compressing said uncompressed digital inbound image data frame into a compressed digital outbound image data frame and concurrently decompressing a compressed digital inbound image data frame into an uncompressed digital receiving image data frame;

an image display means for converting said uncompressed digital receiving image data frame into a corresponding visible image display for the user of said ITTDC;

a PSTN access means for concurrently converting a digital outbound data stream into a suitable analog signal waveform for reliable transmission through said PSTN and concurrently converting an analog inbound signal waveform from said PSTN into a corresponding digital inbound data stream wherein said PSTN access means is further provided with an operating data rate of communication ("DRPS") for communicating with all other associated communication parameters between a user of said ITTDC and said user's communication partner and wherein said PSTN access means is further coordinating with said image CODEC having a number of selectable image compression plans to select a corresponding number of graduations of image quality each with its associated data rate of communication for said image CODEC (DRIM) such that the maximum possible DRIM is equal to DRPS−DRAD;

a local data read and write means for storing an embedded system control software with associated control data, permanent ITTDC operating parameters as well as temporarily or permanently storing said compressed digital outbound audio data stream, said compressed digital inbound audio data stream, said compressed digital outbound image data frame and said compressed digital inbound image data frame;

an optional electronic interface means for communication with other electronic devices locally attached to the ITTDC;

a user-control means for accepting user controls of the ITTDC directing its operations;

a system control means for interfacing with and further controlling said integrated telephone front end, said audio CODEC, said image input means, said image CODEC, said image display means, said PSTN access means, said local data read and write means, said optional electronic interface means and said user-control means to perform a plurality of desirable functions with respect to said simultaneous transmission and receiving (transceiving) of real-time audio and non-real time image; and wherein said selectable image compression plans come from a set of industry standards selected from the group consisting of the following plans:

|  | Compression Ratio | Image Quality | Multi-frame |
| --- | --- | --- | --- |
| JPEG | 1:4~1:30 | Best~Good | No |
| JPEG 2000 | 1:4~1:50 | Best~Good | Yes |
| TIFF | ~1:1 | Best | No |
| Motion JPEG | 1:4~1:30 | Best~Good | Yes |
| GIF | ~1:30 | Good | Yes. |

* * * * *